J. FORSTROM.
EQUALIZING MECHANISM.
APPLICATION FILED MAR. 15, 1915.
1,223,486.
Patented Apr. 24, 1917.
2 SHEETS—SHEET 1.
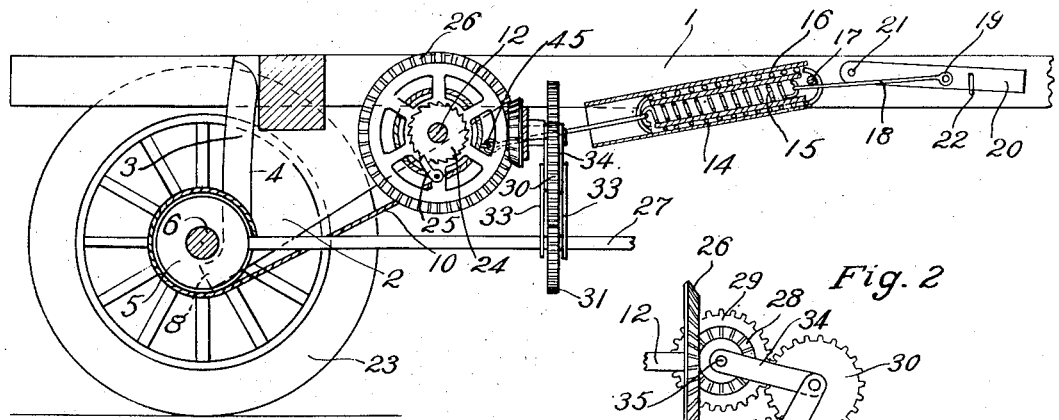
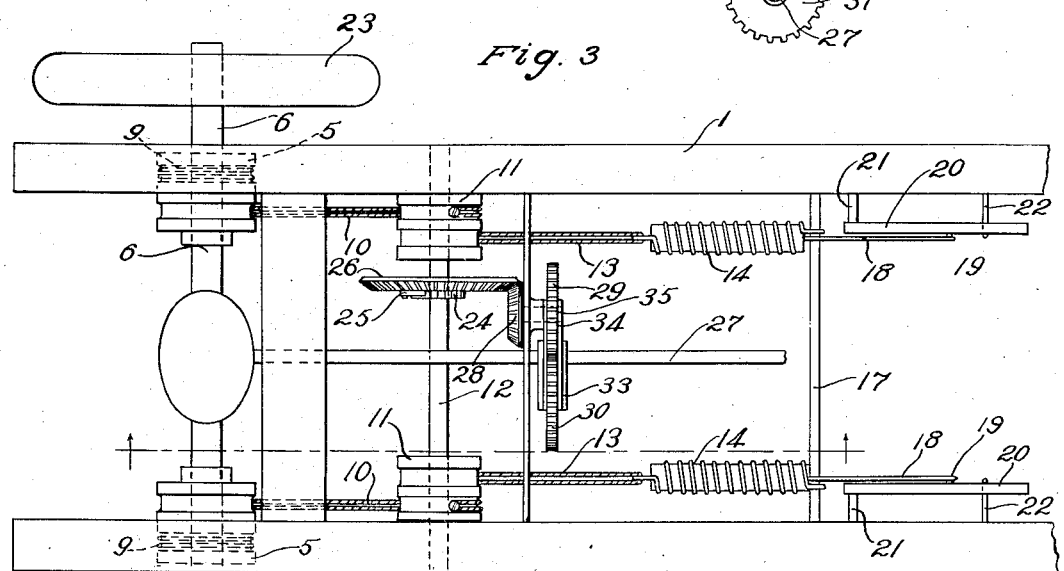
Witnesses:
Walter F. Stone
M. H. Klamt
Inventor:
John Forstrom
By Rummler & Rummler
Attys.

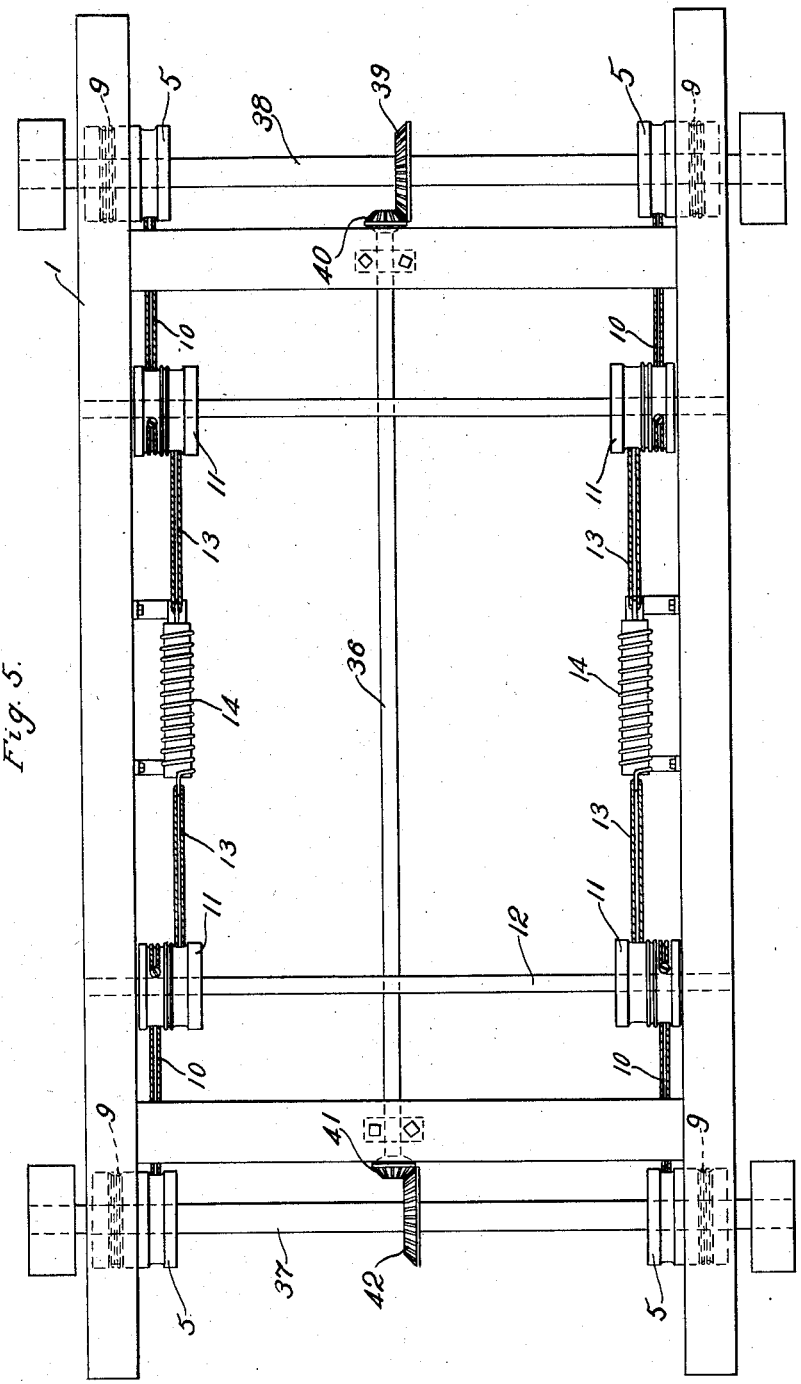

UNITED STATES PATENT OFFICE.

JOHN FORSTROM, OF CHICAGO, ILLINOIS.

EQUALIZING MECHANISM.

1,223,486.    Specification of Letters Patent.    Patented Apr. 24, 1917.

Application filed March 15, 1915. Serial No. 14,575.

*To all whom it may concern:*

Be it known that I, JOHN FORSTROM, a citizen of the United States of America, and a resident of Chicago, county of Cook, and State of Illinois, have invented certain new and useful Improvements in Equalizing Mechanisms, of which the following is a specification.

This invention relates to the supporting mechanism of vehicle bodies or scale platforms and devices of that nature wherein it is desirable to maintain the vehicle body or platform in horizontal position while said body oscillates vertically with respect to its supporting structure. Yieldingly mounted vehicle bodies have been provided with equalizing mechanism intended to distribute the spring action throughout all of the supporting springs when one of the springs is directly displaced by a relative vertical movement of the particular vehicle wheel with which it is associated, but such mechanisms did not prevent sidewise tilting of the vehicle body with respect to its supporting wheels. As most vehicles are constructed, when one wheel is lifted higher than the other, the spring above said wheel will be compressed and upon expanding will, with the upward movement of said wheel, cause the vehicle body to tilt and compress the opposite spring, resulting in the setting up of a sidewise oscillation of the vehicle body. The device of the present invention under like circumstances compels the vehicle body to oscillate vertically without lateral tilting.

The main objects of this invention are to provide equalizing mechanism for yieldingly suspended bodies, such as vehicle or scale platforms, said mechanism operating to maintain the platforms in horizontal position regardless of the vertical movements of the platform under loads which are not uniformly applied thereto; to provide means for utilizing the oscillations of vehicle bodies when traveling over uneven surfaces to perform useful work; to provide improved gearing for positively transmitting power between relatively moving objects such as the motor or engine of a vehicle mounted on the yieldingly suspended vehicle body and the traction wheels which are journaled on a separate frame; and to provide in a vehicle, yielding connections including springs between the vehicle body and its supporting structure, with manually controlled means for making one or more of the springs effective or ineffective for the purpose of varying the resistance of said connections to relative movements between the body and its support and thereby compensate for varying loads which may be supported by the vehicle.

An illustrative embodiment of this invention is shown in the accompanying drawings, in which—

Figure 1 is a fragmentary vertical section of a vehicle constructed according to this invention.

Fig. 2 is a detail in elevation showing gearing for positively transmitting power between the relatively movable vehicle body and chassis.

Fig. 3 is a plan view of the mechanism shown in Fig. 1.

Fig. 4 is a detail in section showing a cable connection between a pulley on one of the vehicle axles and the frame of the vehicle body.

Fig. 5 is a plan view showing the invention as applied to vertically movable platforms such as scale platforms.

Figs. 1 to 4 of the drawings are more or less diagrammatic and show only such parts of the vehicle structure as relate directly to the present invention. In the drawings, the frame 1 of the vehicle body is shown as having a pair of depending frame members 2 having at their outer rear edges flanges 3, to provide ways 4 for rollers or pulleys 5 journaled on a rear axle 6 of the vehicle. The flanges 3 terminate in rearwardly extending lugs 8 below the axle 6 which coöperate therewith to limit the upward movement of the vehicle body with respect to the axle.

Each of the drums 5 has secured thereto a belt or cable 9 which partly encircles the drum and at its other end is secured to the corresponding depending frame 2. By this cable connection, whenever the body 1 is forced downwardly with respect to the vehicle wheels, the cables 9 compel a corresponding rotation of drums 5. The drums 5 also have secured thereto cables 10 which at their opposite ends are secured to smaller drums 11 rigidly mounted upon a shaft 12 journaled in the vehicle body frame 1. Also secured to the drums 11 are cables 13 connecting these drums with two pairs of springs 14 and 15, in each case the latter being movable within the former and each pair being surrounded by a cylindrical casing 16 for containing a lubricant for the springs.

Springs 14 are preferably heavier than the springs 15 and are secured at one end to a bar 17 rigidly mounted in frame 1. The springs 15 are secured to links 18 pivoted by bolts 19 to levers 20, in turn pivoted to frame 1 by the bolts 21. The levers 20 normally rest on lugs 22 in such position to keep the pivots 19 below a center line passing through the pivots of lever 20, and the point of attachment 45 of cables 13 with drums 11. By raising levers 20 sufficiently to bring the pivots 19 above said center line, springs 15 may contract and become ineffective. Therefore, by means of levers 20, springs 15 may be made effective or ineffective to vary the spring resistance between the vehicle body and chassis as required to compensate for different loads carried by the vehicle. The springs 15 normally need not be employed, but are particularly useful to increase the spring resistance of the vehicle body when an unusually heavy load is carried thereby.

In the operation of the spring mechanism, vertical movements of the vehicle wheels 23 when passing over uneven surfaces, or when a load is placed on platform 1, whether equally distributed or not, causes a relative movement between the platform and the axle 6 and wheels supported thereon in a vertical direction, but no relative tilting action occurs. This is due to the fact that whenever the body 1 moves up or down with respect to axle 6, the drums 5 are compelled to rotate accordingly by their cable connections 9, and the rotation of these drums is communicated through the cables 10 to drums 11, the latter being fixed to shaft 12.

Thus, through the shaft 12, a motion of the drums on one side must be transmitted to the drums on the opposite side of the vehicle and therefore the lateral tilting of the vehicle body is prevented. Rotation of the drums 5 and 11, and therefore relative movement between the vehicle body and chassis, is yieldingly resisted by springs 14 through their connections with drums 11.

For the purpose of providing a brake to retard continued oscillation of the vehicle body after it is once set in motion when passing over uneven road surfaces, and at the same time to utilize some of the energy which is normally dissipated in maintaining the vertical oscillation of the vehicle body, shaft 12 carries rigidly a ratchet wheel 24, this wheel coöperating with a pawl 25 pivoted to a bevel gear 26 loosely journaled on shaft 12. The ratchet wheel is so placed on the shaft that its teeth will engage the pawl and rotate gear 26 upon upward movements of the vehicle body with respect to axle 6, while on the downward movements of the body, the ratchet idly passes the pawl in the opposite direction. Rotation of gear 26 is transmitted to a shaft 27 through the gears 28, 29, 30, and 31, the latter being fast on shaft 27. Shaft 27 may be the power transmission shaft for having connections both to the engine or motor and the driven axle 6. By this construction, if the oscillation of the vehicle body is at a rate sufficiently high to urge the shaft 27 to rotate faster than it is driven by the engine or motor, the vertical oscillation of the vehicle body may be braked to an extent proportionate to the amount of power which by this mechanism is transmitted to the shaft 27. However, the rate of oscillation of the vehicle body and shaft 12 is limited by the load carried by the shaft 27. This ratchet and gear mechanism therefore acts as a differential brake on the vehicle spring mechanism, producing a greater resistance when the load on shaft 27 is heavy than when it is light. Any adjustable friction device might, to some extent, serve the same purpose as this braking mechanism, but its action would not ordinarily automatically vary under changes of load.

The train of gears 29, 30 and 31 provide a highly efficient mechanism for transmitting power between the relatively movable vehicle body and chassis. The intermediate gear 30 is carried by links 33 and 34, respectively journaled on shaft 27 and the stubshaft 35 which carries gears 28 and 29. These links serve to maintain the gear 30 in mesh with both gears 29 and 31, regardless of the movements of gears 29 and 31 toward and away from each other and if necessary, while all of the gears are rotating, since the links or arms 33 and 34 form a toggle permitting movement of the gears 31 and 29 toward and away from each other while compelling the gear 30 to approach or recede from a line passing through the centers of gears 29 and 31, according to their distance apart, but always maintaining engagement with both of said gears.

In Fig. 1, the runway 4 is shown curved as though the forward end of frame 1 were pivoted to rock about a horizontal axis, but if desired, this runway 4 may be vertically disposed and the spring mechanism so far described, duplicated at the forward end of the vehicle and connected in the same manner to the front axle. Fig. 5 shows a modification having such arrangement and also a longitudinal shaft 36 journaled in the chassis for communicating motion between the two sets of drums 5 on the axles 37 and 38 to compel these drums to rotate in unison, that is, when the forward set of drums are rotated by a relative movement between the frame 1, the shaft 38, the gear connections 39 and 40 and shaft 36, and the gears 41 and 42 and shaft 37 serve to compel a corresponding rotation of the drums 5 on shaft 37, thus compelling the frame 1 to oscillate vertically without tilting out of its horizontal plane. In this modification, the connections of drums 5 and 11 are the same, but in place of the springs 14 and 15, the springs 15 only are employed, being connected at their ends to both sets of drums 11.

In the operation of the device shown in Fig. 5, a load placed on the frame 1, or a shock transmitted to said frame will result in its moving up and down without rocking it out of a horizontal plane, regardless of whether said load or shock is uniformly distributed or not. In all cases, the result of applying a load to platform 1 causes it to lower more or less through the cables 9, rotating drums 5 and the shafts 37 and 38. No one pulley 5 can rotate without causing all of said drums to rotate, since they are rigid on the shafts 37 and 38 and these shafts are geared together through the gears 39, 40, 41 and 42 and shaft 36. A resistance to vertical movement of the frame or platform 1 occurs at the springs 14 which are connected to pulleys 11 and 5 in the same manner as described in connection with Figs. 1 and 2.

Although but one specific embodiment of this invention has been herein shown and described, it will be understood that numerous details of the construction shown may be altered or omitted without departing from the spirit of this invention as defined by the following claims.

I claim:—

1. An equalizing mechanism of the class described, comprising a body and support, a plurality of oscillatory members pivotally mounted on said body, a plurality of oscillatory members pivotally mounted on said support, connections between said members compelling them to oscillate as a unit upon relative movements between said body and support, and means for resisting oscillations of said members.

2. A device of the class described, comprising a body and a support, connections between said body and support for yieldingly supporting the body thereon, means for communicating mechanical motion between said body and support, said means comprising a gear journaled on said body and a second gear connected with said support and movable therewith relative to said body, and an intermediate gear journaled on a pair of links each of which is respectively journaled concentric with said first mentioned gears on said body and support.

3. A device of the class described, comprising a body and a support, drums rotatably mounted on each side of said body and rigidly secured together, drums rotatably mounted on each side of said support and rigidly secured together, belts connecting said drums on the body and the support, and yielding means for resisting rotation of said drums.

4. An equalizing mechanism of the class described, comprising a body and support, a plurality of oscillatory members pivotally mounted on said body and on said support, connections between said plurality of members compelling them to oscillate as a unit upon relative movements between said body and support, and adjustable means for differentially resisting oscillations of said members.

5. A device of the class described, comprising a body and a support, connections between said body and support for yieldingly supporting the body thereon, and gearing connecting said body and support for the purpose of communicating mechanical motion therebetween, said gearing comprising a plurality of gears one of which is arranged to have a limited revolving motion around the other, whereby said body and support may move relatively to each other without disengaging said gears.

6. A device of the class described, comprising a body and a support, drums rotatably mounted on each side of said body and rigidly secured together, drums rotatably mounted on each side of said support, belts connecting said drums on the body and the support, and yielding means for resisting rotation of said drums.

Signed at Chicago this 11th day of March, 1915.

JOHN FORSTROM.

Witnesses:
RUDOW RUMMLER,
MARY R. HOPKINS.